(12) United States Patent
Kobayashi et al.

(10) Patent No.: US 6,263,347 B1
(45) Date of Patent: Jul. 17, 2001

(54) SYSTEM FOR LINKING DATA BETWEEN COMPUTER AND PORTABLE REMOTE TERMINAL AND DATA LINKING METHOD THEREFOR

(75) Inventors: Osamu Kobayashi; Seiichi Yoda, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/300,463

(22) Filed: Apr. 28, 1999

(30) Foreign Application Priority Data

Apr. 28, 1998 (JP) .................................................. 10-134526

(51) Int. Cl.⁷ ..................................................... G06F 17/30
(52) U.S. Cl. ............................. 707/201; 707/8; 707/100; 707/101; 707/103; 707/530; 709/238; 709/315; 710/20; 710/21; 711/141
(58) Field of Search ................................ 707/1, 3, 8, 10, 707/100, 101, 102, 103, 201, 530; 709/227, 312, 315, 213, 238; 711/100, 133, 171, 203, 141, 202, 220, 221; 712/245, 229; 710/5, 6, 20, 132, 21; 455/428

(56) References Cited

U.S. PATENT DOCUMENTS

| | | | |
|---|---|---|---|
| 4,627,019 | * 12/1986 | Ng | 707/8 |
| 5,010,478 | * 4/1991 | Deran | 707/100 |
| 5,386,559 | * 1/1995 | Eisenberg et al. | 707/201 |
| 5,414,812 | * 5/1995 | Filip et al. | 707/103 |
| 5,448,727 | * 9/1995 | Annevelink | 707/101 |
| 5,504,879 | * 4/1996 | Eisenberg et al. | 707/100 |
| 5,592,664 | * 1/1997 | Starkey | 707/1 |
| 5,596,745 | * 1/1997 | Lai et al. | 707/103 |
| 5,634,124 | * 5/1997 | Khoyi et al. | 707/103 |
| 5,666,490 | * 9/1997 | Gillings et al. | 709/238 |
| 5,706,509 | * 1/1998 | Tso | 707/201 |
| 5,717,919 | * 2/1998 | Kodavalla et al. | 707/8 |

FOREIGN PATENT DOCUMENTS

| | | |
|---|---|---|
| 2-58165 | 2/1990 | (JP) . |
| 5-89004 | 4/1993 | (JP) . |
| 8-305714 | 11/1996 | (JP) . |

OTHER PUBLICATIONS

Ehikioya, Sylvanus et al., "A Formal Specification Strategy for Electronic Commerce", Proceedings of the 1997 International Database Engineering and Applications Symposium, IDEAS '97., Aug. 25–27, 1997, pp. 201–210.*

Am–suk Oh et al., "An Incremental Update propagation Scheme for a Cooperative Transaction Model", Proceedings of the Seventh International Workshop on Database and Expert Systems Applications, Sep. 9–10, 1996, pp. 353–362.*

* cited by examiner

*Primary Examiner*—Kim Vu
*Assistant Examiner*—Shahid Alam
(74) *Attorney, Agent, or Firm*—Foley & Lardner

(57) ABSTRACT

In a data linking method of extracting data of a host data base on a computer into a portable remote terminal, an item definition data base which defines a record attribute, an object storage data base which stores object data on a record basis, a relation definition data base which defines relations among object data and a definition data base which defines relations among the respective data bases, and conducts synchronous processing of writing. The portable remote terminal conducts link data solution processing based on a record attribute of the item definition data base when a record item of the object storage data base refers to other object storage data base, and changes, when the display order of object data of the object storage data base is changed or when existence/non-existence of display is selected, the display order of object data of said item definition data base or an attribute indicative of existence/ non-existence of display according to the contents of the change or the selection, and the computer further reads an updated record from said object storage data base of the portable remote terminal to update the host data base.

11 Claims, 11 Drawing Sheets

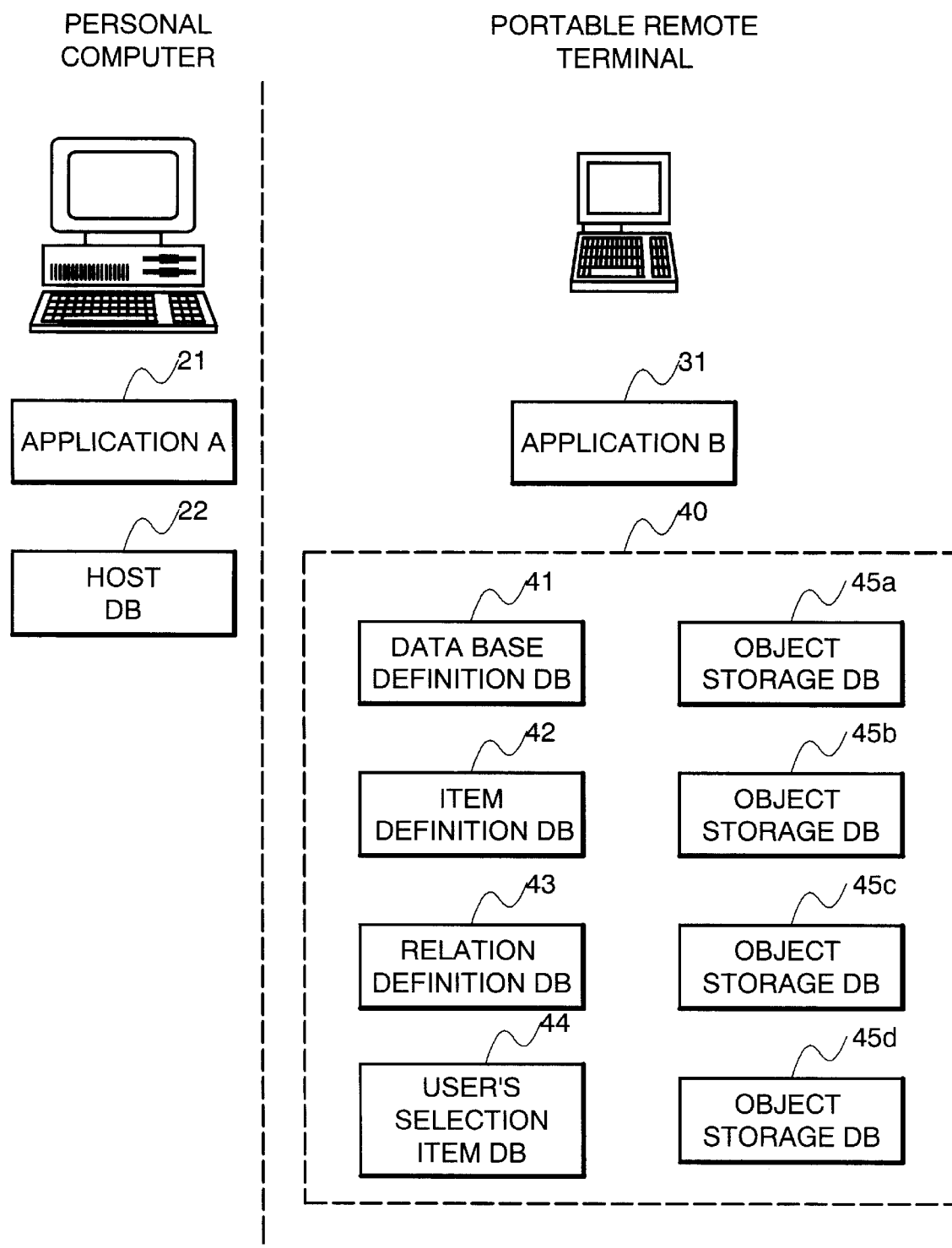

FIG. 4

| DB NAME | DB ATTRIBUTE | SYNCHRONIZATION TIME AND DATE | DB UPDATING FLAG |
|---|---|---|---|
| 123 | DB_USERID | 199705300900 | 0 |
| ITEM DEFINITION | DB_DEFLNE | 199705300900 | 1 |
| RELATION DEFINITION | DB_RELATE | 199705300900 | 0 |
| USER'S SELECTION ITEM | DB_CHOICE | 199705300900 | 0 |
| COMPANY | DB_RECORD | 199705300900 | 1 |
| PRODUCT | DB_RECORD | 199705300900 | 0 |

FIG. 6

| HOST DB NAME | DETAILED DB NAME | LINK DESTINATION DETAILED DB ITEM NAME |
|---|---|---|
| COMPANY | BUSINESS NEGOTIATIONS | TIE-UP COMPANY |
| COMPANY | PRODUCT | DEVEROPER |
| COMPANY | CONTACT | OPPOSITE PARTY COMPANY |
| COMPANY | SCHEDULE | PARTICIPANT COMPANY |
| PRODUCT | BUSINESS NEGOTIBTIONS | TARGET PRODUCT |
| PRODUCT | COMPANY | TIE-UP PRODUCT |
| PRODUCT | CUSTOMER | PRODUCT OF DEAL |

FIG. 5

| 42-1 | 42-2 | 42-3 | 42-4 | 42-5 | 42-6 | 42-7 | 42-8 | 42-9 | 42-10 | 42-11 | 42-12 | 42-13 |
|---|---|---|---|---|---|---|---|---|---|---|---|---|
| DB NAME | ITEM NAME | DATA TYPE | CONTROL ATTRIBUTE | ITEM WIDTH | REFERENCE DB NAME | REFERENCE KEY | LINK DESTINATION ITEM NAME | REFERENCE ITEM NAME | LIST DISPLAY ORDER | CARD DISPLAY ORDER | RECORD IDX | UPDATING FLAG |
| COMPANY | SERIAL ID | DT_ID | IP_HEADER | --- | --- | --- | --- | --- | --- | --- | 0 | 0 |
| COMPANY | RECORD ID | DT_ID | IP_HEADER | --- | --- | --- | --- | --- | --- | --- | 1 | 0 |
| COMPANY | TIME STAMP | DT_TIMESTAMP | IP_HEADER | --- | --- | --- | --- | --- | --- | --- | 2 | 0 |
| COMPANY | UPDATING FLAG | DT_FLAG | IP_HEADER | --- | --- | --- | --- | --- | --- | --- | 3 | 0 |
| COMPANY | COMPANY NAME | DT_TEXT | IP_MUST | 200 | --- | --- | --- | --- | 1 | 1 | 4 | 1 |
| COMPANY | HOW TO READ | DT_MEMO | IP_STATIC | 120 | --- | --- | --- | --- | 0 | 3 | 5 | 1 |
| COMPANY | CATEGORY OF BUSINESS | DT_CMB | IP_NOMAL | 120 | USER'S SELECTION | COMPANY 1 | --- | --- | 3 | 5 | 6 | 0 |
| COMPANY | SCALE | DT_CHOICE | IP_NOMAL | 80 | USER'S SELECTION | COMPANY 2 | --- | --- | 5 | 4 | 7 | 0 |
| COMPANY | LINE OF TRADE | DT_LINK | IP_NOMAL | 100 | PRODUCT | PRODUCT NAME | LINE OF TRADE | PRICE | 4 | 0 | 8 | 0 |
| COMPANY | UNIT PRICE | DT_TEXT | IP_STATIC | 90 | --- | --- | --- | --- | 0 | 2 | 9 | 0 |
| PRODUCT | SERIAL ID | DT_ID | IP_HEADER | --- | --- | --- | --- | --- | --- | --- | 0 | 0 |
| PRODUCT | RECORD ID | DT_ID | IP_HEADER | --- | --- | --- | --- | --- | --- | --- | 1 | 0 |
| PRODUCT | TIME STAMP | DT_TIMESTAMP | IP_HEADER | --- | --- | --- | --- | --- | --- | --- | 2 | 0 |
| PRODUCT | UPDATING FLAG | DT_FLAG | IP_HEADER | --- | --- | --- | --- | --- | --- | --- | 3 | 0 |
| PRODUCT | PRODUCT NAME | DT_TEXT | IP_MUST | 200 | --- | --- | --- | --- | 1 | 1 | 4 | 0 |
| PRODUCT | HOW TO READ | DT_MEMO | IP_STATIC | 120 | --- | --- | --- | --- | 2 | 2 | 5 | 0 |
| PRODUCT | PRICE | DT_TEXT | IP_NOMAL | 90 | --- | --- | --- | --- | 3 | 3 | 6 | 0 |

| KEY NAME | ITEM VALUE | ITEM CONTENTS |
|---|---|---|
| COMPANY 1 | 0 | ELECTRIC |
| COMPANY 1 | 1 | FORESTRY |
| COMPANY 1 | 2 | COMMUNICATIONS |
| COMPANY 1 | 0 | NATIONAL |
| COMPANY 2 | 1 | OVERSEAS |

FIG. 8

Table 451 (45a):

| SERIAL ID | RECOAD ID | TIME STAMP | UPDATING FLAG | ITEM 1 | ITEM 2 | ITEM 3 | ITEM 4 | ITEM 5 | ITEM 6 |
|---|---|---|---|---|---|---|---|---|---|
| 1 | 0000000001 | 199705301530 | 1 | NEC CORP. | NIPPON DENKI | ELECTRIC | 3 | 1 | 10000 |
| 2 | 0000000002 | 199705301530 | 0 | ABCD SOFTWARE | ABCD | INFORMATION | 0 | 2 | 5000 |
| 3 | 0000000003 | 199705301530 | 0 | EEEE | EEEE | SOFT | 1 | 50 | 400 |

Table 452 (45b):

| SERIAL ID | RECOAD ID | TIME STAMP | UPDATING FLAG | ITEM 1 | ITEM 2 | ITEM 3 |
|---|---|---|---|---|---|---|
| 1 | 0000000001 | 199705301530 | 0 | WORD PROCESSOR | WAPRO | 10000 |
| 2 | 0000000002 | 199705301530 | 0 | PORTABLE CALCULATOR | DENTAKU | 5000 |

FIG. 13

<COMPANY>

| Label | Field | Value |
|---|---|---|
| 601 | COMPANY NAME: | NEC CORP. |
| 602 | HOW TO READ: | NIPPON DENKI |
| 603 | METROPOLIS/PREFECTURE: | TOKYO-TO |
|  | CITY/WARD: | FUCHU-CITY |
|  |  | 1-10 NISSIN-CHO |
| 604 | TELEPHONE: | +81 (0423) 33-1510 |
| 605 | FACSIMILE: | +81 (0423) 33-1750 |
| 606 | RELATION: | PARTNER ▶ |

600

SYSTEM FOR LINKING DATA BETWEEN COMPUTER AND PORTABLE REMOTE TERMINAL AND DATA LINKING METHOD THEREFOR

BACKGROUND OF THE INVENTION

1. Field of the Invention

The present invention relates to a system for linking data between a computer and a portable remote terminal and a data linking method therefor and, more particularly, to a system for linking data between a computer and a portable remote terminal enabling data extracted from a personal computer into a portable remote terminal to be edited and applied freely and a data linking method therefor.

2. Description of the Related Art

In recent years, more and more cases occur in business etc. where various information in a data base on a computer at an office is brought out by a portable remote terminal to user's destination and is made the most of. Conducted, for example, are bringing out customer's information into a portable remote terminal and referring to/editing the information, or bringing information of a product of outside trade into a portable remote terminal and referring to the information, or bringing out information about business negotiations that a user currently has into a portable remote terminal and making the most of the information.

In a case where data on a data base of a personal computer is read into a portable remote terminal and the portable remote terminal is brought to a user' destination to use the data, when a volume of data is large, much time is conventionally cost for the processing of extracting data from the personal computer into the portable remote terminal and the processing of synchronizing the terminal with the personal computer which is conducted when data editing is executed on the portable remote terminal because the data in the personal computer is taken in as it is into the portable remote terminal.

Also in conventional systems, data in a data base is taken in as it is into a portable remote terminal to result in bringing out data that needs not to be brought out by the portable remote terminal as well, which hinders operation and application when necessary data is actually referred to by the portable remote terminal.

Among conventional art related to data link between computers are, for example, distributed data base management systems disclosed in Japanese Patent Laying-Open (Kokai) No. Heisei 8-305714 and Japanese Patent Laying-Open (Kokai) No. Heisei 2-58165.

Disclosed in Japanese Patent Laying-Open (Kokai) No. Heisei 5-89004 is a technique of downloading a data base of a host computer into a portable remote terminal and uploading data updated offline by the portable remote terminal into the host computer in synchronization with the host computer.

The above-described conventional data link between a personal computer and a portable remote terminal has such problems as set forth below.

First, since data on the personal computer is taken in into the portable remote terminal as it is, when a volume of data is large, much time is cost for the processing of extracting data from the personal computer into the portable remote terminal and the processing of synchronizing the terminal with the personal computer which is conducted when data edging is executed on the portable remote terminal.

Secondly, in a conventional system, data in a data base is taken in into a portable remote terminal as it is to result in bringing out data that needs not to be brought out by the portable remote terminal as well, which hinders quick application of data when necessary data is actually referred to by the portable remote terminal.

Thirdly, since data taken in into a portable remote terminal should be synchronized with a host data base on a computer, the order of items of data on the portable remote terminal can not be changed by a user as required. This prevents efficient use of data.

Although Japanese Patent Laying-Open (Kokai) No. Heisei 5-89004 discloses a system of downloading a data base of a host computer into a portable remote terminal and uploading data updated offline by the portable remote terminal into the host computer in synchronization with the host computer, the system only provides synchronization of the data updated on the portable remote terminal based on user ID and fails to solve none of the above-described problems.

Also, the distributed data base management systems disclosed in the above-described Japanese Patent Laying-Open (Kokai) No. Heisei 8-305714 and Japanese Patent Laying-Open No. 2-58165 relate to a technique of providing synchronization of data bases dispersedly arranged at a plurality of sites connected through LAN, they recite none of a technique of bringing out a data base on a computer into a portable remote terminal to conduct reference/editing and synchronous processing as well.

SUMMARY OF THE INVENTION

A first object of the present invention is to provide a system for linking data between a personal computer and a portable remote terminal which enables execution of the processing of extracting data from the personal computer into the portable remote terminal and the processing of synchronizing the portable remote terminal with the personal computer in a short time period, and a data linking method therefor.

A second object of the present invention is to provide a system for linking data between a personal computer and a portable remote terminal which realizes quick application of data by selectively taking in data that needs to be brought out from a data base of the computer by the portable remote terminal, and a data linking method therefor.

A third object of the present invention is to provide a system for linking data between a personal computer and a portable remote terminal which enables the order of items of data taken in into the portable remote terminal to be changed by a user as required, thereby realizing efficient use of data, and a data linking method therefor.

According to the first aspect of the invention, a system for linking data between a computer and a portable remote terminal which extracts data of a host data base on the computer into the portable remote terminal, displays and edits the extracted data on the portable remote terminal and conducts synchronous processing of updated data in the portable remote terminal and a data base in the computer, wherein the computer comprissing means for selecting object data to be brought out from the host data base into the portable remote terminal and a record item of the object data, means for creating on the portable remote terminal, with respect to selected object data, an item definition data base which defines a record attribute, an object storage data base which stores object data on a record basis correspondingly to the item definition data base, a relation definition data base which defines relations among object data stored in the object storage data base and a definition data base which defines relations among the respective data bases created, means for writing, on the basis of a record taken out from the host data base, data into the corresponding one of the object storage data bases according to the item definition data base, and synchronization means for conducting synchronous processing of reading updated data from the object storage data base of the portable remote terminal and writing the data into the host data base of the computer, and the portable remote terminal comprising means for conducting, when a record item of the object storage data base refers to other the object storage data base, link data solution processing based on a record attribute of the item definition data base, and means for changing, when the display order of object data of the object storage data base is changed or when existence/non-existence of display is selected, the display order of object data of the item definition data base or an attribute indicative of existence/non-existence of display according to the contents of the change or the selection, and wherein the synchronization means of the computer reads an updated record from the object storage data base of the portable remote terminal to update the host data base of the computer.

In the preferred construction, the portable remote terminal further comprises updating flag setting means for setting, when updating or addition of a record is made of the object storage data base, an updating flag at the corresponding record of the object storage data base.

In another preferred construction, the portable remote terminal further comprises editing means for editing object data stored in the object storage data base and conducting change of the display order of data items or selection of existence/non-existence of display.

In another preferred construction, the portable remote terminal further comprises updating flag setting means for setting, when updating or addition of a record is made of the object storage data base, an updating flag at the corresponding record of the object storage data base, and wherein the updating flag setting means, when updating or addition of a record is made of the object storage data base, sets a flag indicating that the object storage data base in question is updated at the definition data base, and the synchronization means searches the object storage data base updated by a flag of the definition data base and reads a record at which the object storage data base updating flag searched is set to update the host data base of the computer.

In another preferred construction, for each record item, the item definition data base has, as attributes, other object storage data base to be referred to by the record item in question and a record item, a record item with which the record item in question links, and a record item of an object storage data base to be referred to by the linked record item.

According to the second aspect of the invention, a method of linking data between a computer and a portable remote terminal which extracts data of a host data base on the computer into the portable remote terminal, displays and edits the extracted data on the portable remote terminal and conducts synchronous processing of updated data in the portable remote terminal and a data base in the computer, comprising the steps of the computer of:

with respect to object data to be brought out into the portable remote terminal which is selected from the host data base and a record item of the object data, creating, on the portable remote terminal, an item definition data base which defines a record attribute, an object storage data base which stores object data on a record basis correspondingly to the item definition data base, a relation definition data base which defines relations among object data stored in the object storage data base and a definition data base which defines relations among the respective data bases created, on the basis of a record taken out from the host data base, writing data into the corresponding one of the object storage data bases according to the item definition data base, and conducting synchronous processing of reading updated data from the object storage data base of the portable remote terminal and writing the data into the host data base of the computer, the steps of the portable remote terminal of:

when a record item of the object storage data base refers to other the object storage data base, conducting link data solution processing based on a record attribute of the item definition data base, and when the display order of object data of the object storage data base is changed or when existence/non-existence of display is selected, changing the display order of object data of the item definition data base or an attribute indicative of existence/non-existence of display according to the contents of the change or the selection, and the step of the computer of reading an updated record from the object storage data base of the portable remote terminal to update the host data base of the computer.

In the preferred construction, the method of linking data between a computer and a portable remote terminal further comprising the step of the portable remote terminal of, when updating or addition of a record is made of the object storage data base, setting an updating flag at the corresponding record of the object storage data base.

In another preferred construction, the method of linking data between a computer and a portable remote terminal further comprising the steps of the portable remote terminal of:

when updating or addition of a record is made of the object storage data base, setting an updating flag at the corresponding record of the object storage data base and further setting a flag indicating that the object storage data base in question is updated at the definition data base, wherein in synchronous processing of the computer, the object storage data base updated by a flag of the definition data base is searched and a record at which the object storage data base updating flag searched is set is read to update the host data base of the computer.

According to another aspect of the invention, a computer readable memory which stores a program for linking data between a computer and a portable remote terminal which extracts data of a host data base on the computer into the portable remote terminal, displays and edits the extracted data on the portable remote terminal and conducts synchronous processing of updated data in the portable remote terminal and a data base in the computer, wherein the data link program comprises the steps of:

on the side of the computer with respect to object data to be brought out into the portable remote terminal which is selected from the host data base and a record item of the object data, creating, on the portable remote terminal, an item definition data base which defines a record attribute, an object storage data base which stores object data on a record basis correspondingly to the item definition data base, a relation definition data base which defines relations among object data stored in the object storage data base and a definition data base which defines relations among the respective data bases created, on the basis of a record taken out from the host data base, writing data into the corresponding one of the object storage data bases according to the item definition data base, and conducting synchronous processing of reading updated data from the object storage data base of the portable remote terminal and writing the data into the host data base of the computer, on the side of the portable remote terminal when a record item of the object storage data base refers to other the object storage data base, conducting link data solution processing based on a record attribute of the item definition data base, and when the display order of object data of the object storage data base is changed or when existence/non-existence of display is selected, changing the display order of object data of the item definition data base or an attribute indicative of existence/non-existence of display according to the contents of the change or the selection, and on the computer, reading an updated record from the object storage data base of the portable remote terminal to update the host data base of the computer.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a diagram showing each program of the personal computer and the portable remote terminal of the present invention and arrangement of a generated DB in the portable remote terminal;

FIG. 4 is a diagram showing table arrangement of a data base definition DB in the DB on the portable remote terminal of the present invention;

FIG. 5 is a diagram showing table arrangement of an item definition DB in the DB on the portable remote terminal of the present invention;

FIG. 6 is a diagram showing table arrangement of a relation definition DB in the DB on the portable remote terminal of the present invention;

FIG. 8 is a diagram showing table arrangement of an object storage DB in the DB on the portable remote terminal of the present invention;

FIG. 13 is a diagram showing an example of data editing screen on the portable remote terminal of the present invention.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
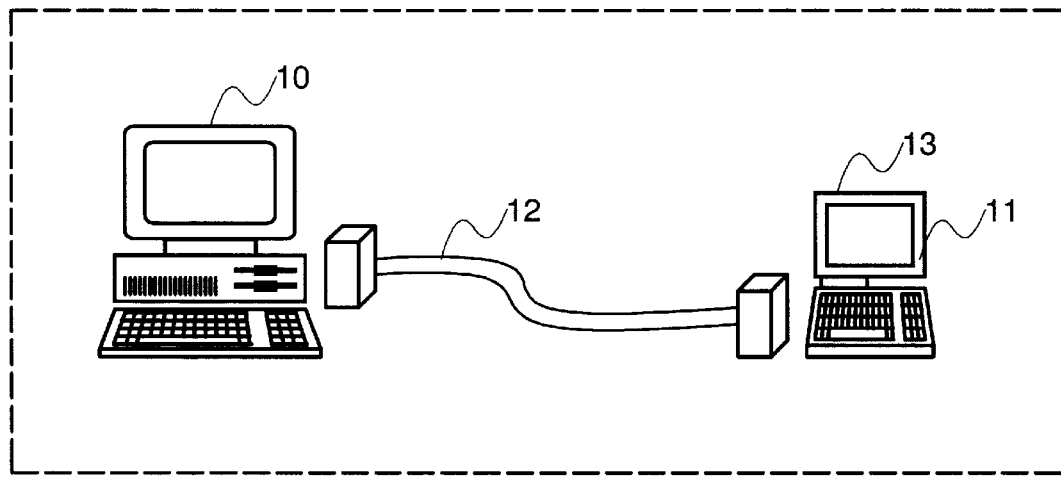
FIG. 1 is a diagram showing system structure of a data link system for linking data between a personal computer and a portable remote terminal according to an embodiment of the present invention.

FIG. 1 is a diagram showing system structure of a data link system for linking data between a personal computer and a portable remote terminal according to the embodiment of the present invention.

The data link system is structured to have a personal computer 10 and a portable remote terminal 11 connected through a connection cable 12, thereby enabling data transmission and reception between the computer and the terminal. 13 denotes an input means (pen) for performing data editing (display and input) on the portable remote terminal 11. The portable remote terminal 11 arbitrarily extracts part of data of a data base (DB) in the personal computer 10 to edit data (display/modification/input).

Figure 2:
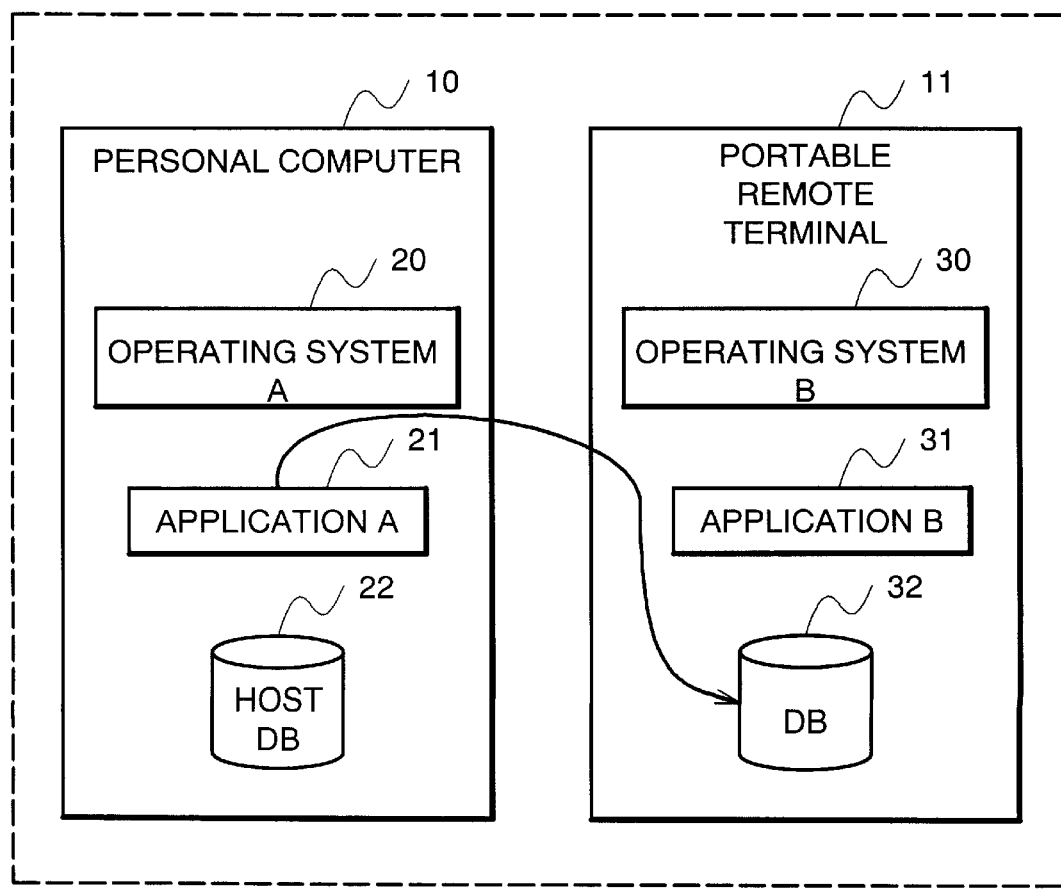
FIG. 2 is a diagram showing program module structure of the personal computer and the portable remote terminal realizing the data link system of the present invention.

FIG. 2 is a diagram showing program module structure of the personal computer 10 and the portable remote terminal 11 realizing the data link system of the present invention. The program module of the personal computer 10 is composed of an operating system A20 and an application program A21 and has a host DB 22. The program module of the portable remote terminal 11 is composed of an operating system B30 and an application program B31 and has a DB 40.

Control for sending and receiving DB data is given by the operating system A20 and the operating system B30. An arrow PO indicates a direction of program control made when the DB40 is accessed by the application program A21 of the personal computer 10.

FIG. 3 shows each program of the personal computer 10 and the portable remote terminal 11 and DB arrangement of the generated DB40 in the portable remote terminal 11.

As illustrated in the figure, the DB40 of the portable remote terminal 11 is composed of a data base definition DB41, an item definition DB42, a relation definition DB43, a user's selection item DB44 and an object storage DB (45a, 45b, 45c, . . . 45n).

Figure 11:
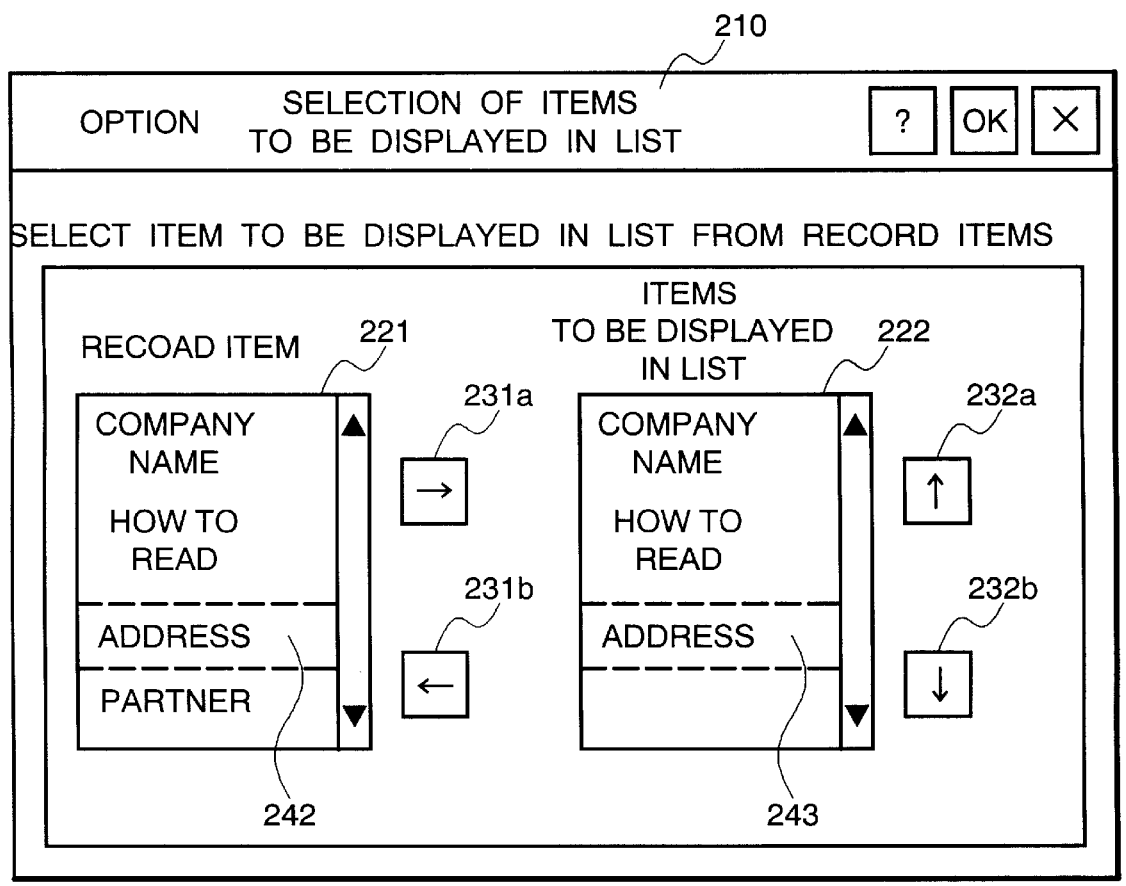
FIG. 11 is a diagram showing an example of display screen on which a user selects the order of data items to be displayed in data editing on the portable remote terminal of the present invention.
Figure 12:
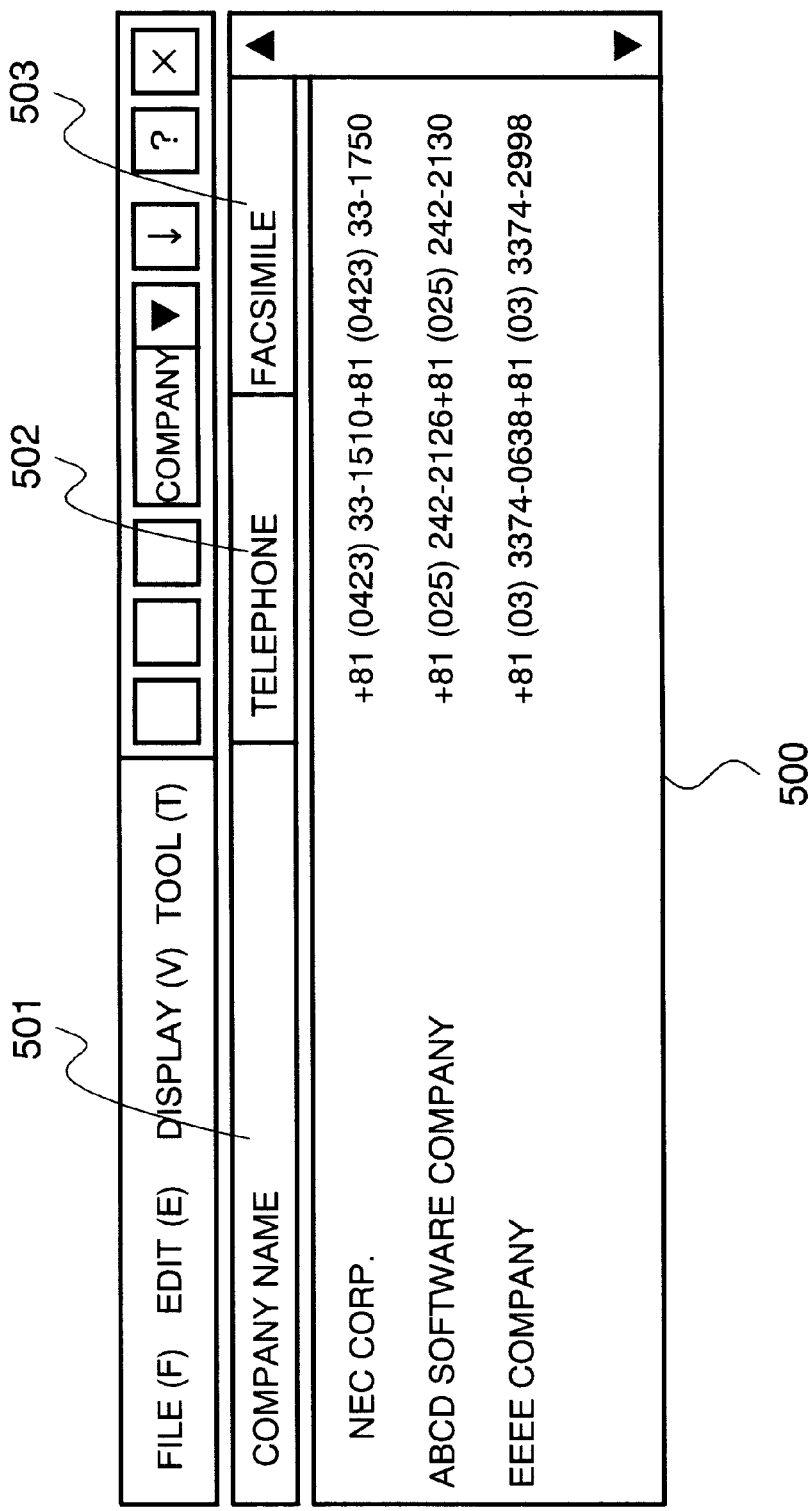
FIG. 12 is a diagram showing an example of data editing screen on the portable remote terminal of the present invention.

Display and editing on the portable remote terminal 11 are executed with respect to data within the DB 40 by the application program B31. FIG. 11 shows an example of a display screen 210 on which a user selects the order of data items to be displayed in data editing (display/input) conducted by the application program B31 on the portable remote terminal 11. FIGS. 12 and 13 each show an example of a screen for data editing conducted on the portable remote terminal 11 by the application program B31 of the portable remote terminal 11.

FIGS. 4 to 8 show structure of the DB40 on the portable remote terminal 11.

FIG. 4 is a diagram showing table arrangement of the data base definition DB41 of FIG. 3. 41-1~41-4 each show a column of the data base definition DB41. 411~416 denote records where data is stored.

FIG. 5 is a diagram showing table arrangement of the item definition DB42 of FIG. 3. 42-1~42-13 each show a column of the item definition DB42. 421~425 denote records where data is stored.

FIG. 6 is a diagram showing table arrangement of the relation definition DB43 of FIG. 3. 43-1~43-3 each denote a column of the relation definition DB43.

Figure 7:
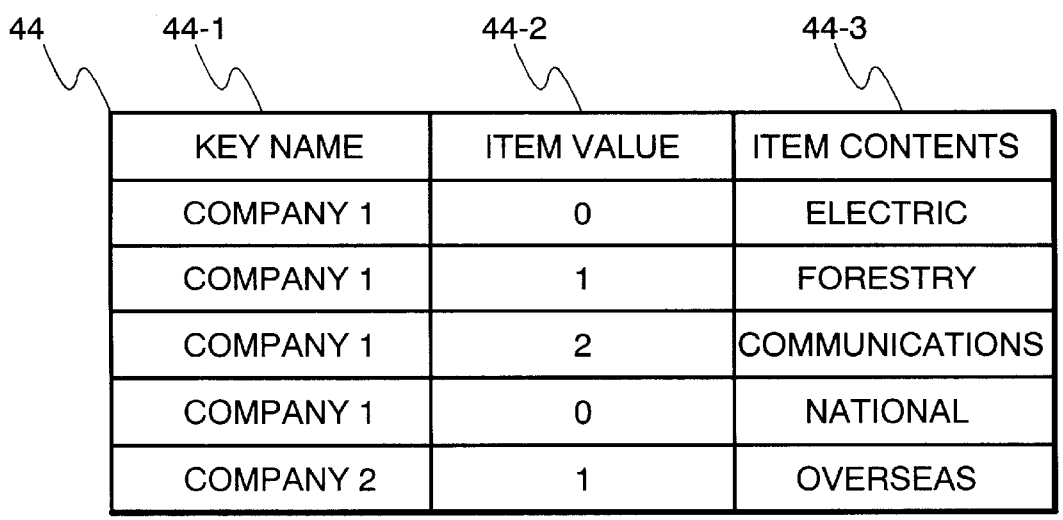
FIG. 7 is a diagram showing table arrangement of a user's selection item DB in the DB on the portable remote terminal of the present invention.

FIG. 7 is a diagram showing table arrangement of the user's selection item DB44 of FIG. 3. 44-1~44-3 each denote a column of the user's selection item DB44.

FIG. 8 is a diagram showing table arrangement of the object storage DBs 45a, 45b, 45c, . . . , 45n. 45-1~45-10 each denote a column of the object storage DB45. The object storage DB45a represents an object storage DB of a company indicated by the record 415 of the data base definition DB41, while the object storage DB45b represents an object storage DB of a product indicated by the record 416 of the data base definition DB41.

Detailed description will be here made of functions and table arrangement of the above-described DB40 on the portable remote terminal 11.

(a) Data Base Definition DB41

The record 411 represents information of user ID (description of "123" here denotes the number of user ID), the record 412 represents the item definition DB42, the record 413 represents the relation definition DB43, the record 414 represents the user's selection item DB44, and the records 415 and 416 define relations of various data bases of the object storage DBs45a and 45b. The data base definition DB41 exists only one within the portable remote terminal 11.

In the data base definition DB41 of FIG. 4, a DB name 41-1 represents a name or a user ID which unitarily identifies a data base. A DB attribute 41-2 represents a data base attribute. Here, DB_USERID is an attribute indicative of a user ID, DB_DEFINE is an attribute indicative of the item definition DB, DB_RELATE is an attribute indicative of the relation definition DB, DB_CHOICE is an attribute indicative of the user's selection item DB and DB_RECORD is an attribute indicative of the object storage DB.

A synchronization time and date 41-3 represents a time stamp when synchronous processing of a data base is conducted. A DB updating flag 41-4 is a flag of a data base to be updated which represents an object not to be synchronized as "0" and an object to be synchronized as "1".

(b) Item Definition DB42

The item definition DB42 defines an attribute of a record item. Definitions corresponding to all the object storage DBs45 are stored. The DB42 exists only one within the portable remote terminal 11.

In the item definition DB42 of FIG. 5, a DB name 42-1 represents a DB name of the object storage DB45. An item name 42-2 represents a record item name and corresponds to the columns 45-1 to 45-10 of the object storage DB45.

A data type 42-3 represents a data type of a record item and a control attribute. DT_TEXT denotes text edit, DT_MEMO denotes memory edit, DT_INT denotes integer edit, DT_ID denotes record ID edit, DT_CURRENCY denotes currency edit, DT_FLOAT denotes floating point edit, DT_BOOL denotes logical value check box, DT_DATE denotes date edit, DT_TIME denotes time edit, DT_TIMESTAMP denotes time stamp edit, DT_CHOICE denotes choice drop down list, DT_CMB denotes combo drop down (edit combo), DT_LINK denotes link field drop down list and DT_FLAG denotes flag edit.

A control attribute 42-4 represents a control attribute of a record item. Here, IP_HEADER denotes a record header (not displayed), IP_NORMAL denotes normal edit, IP_MUST denotes input must and IP_STATIC denotes edit disabled. An item width 42-5 represents a display size of a record item.

A reference DB name 42-6 represents a name of a DB to be referred to such as combo, choice and link.

Here, DT_CMB represents a name of the user's selection item DB44, DT_CHOICE represents a name of the user's selection item DB44 and DT_LINK represents a name of the object storage DB45. A reference key 42-7 represents a key for use in obtaining a record from a reference DB. Here, DT_CMB denotes a key name of the user's selection item DB44, DT_CHOICE denotes a key name of the user's selection item DB44 and DT_LINK denotes an item name of the object storage DB45.

A link destination item name 42-8 represents a correlated DT_LINK item name. A reference item name 42-9 represents a reference item name in a DB referred to by a DT_LINK item.

A list display order 42-10 represents the item display order selected in the list display, in which 0 denotes that no item is displayed and an integer not less than 1 indicates the display order number (integer). A card display order 42-11 represents the item display order selected in the card display, in which 0 denotes that no item is displayed and an integer not less than 1 indicates the display order number (integer).

A record index 42-12 represents an index to each column of a record of the object storage DB45 in question. Index exists only for an item that a user has brought out. An updating flag 42-13 is a flag of a record to be updated which represents an object not to be synchronized as 0 and an object to be synchronized as 1.

(c) Relation Definition DB43

The relation definition DB43 defines relations such as detailed/link destination corresponding to the object storage DB45. Definitions corresponding to all the object storage DBs45 are stored. The relation definition DB43 exists only one within the portable remote terminal 11.

A host DB name 43-1 represents a top-level object storage DB name which is a DB name of the object storage DB45 as a host. A detailed DB name 43-2 denotes a second-level object storage DB name which is a detailed DB name that can be displayed with respect to the host object storage DB45. A link destination detailed DB item name 43-3 represents an item name of a detailed DB where a record ID of a host DB is stored.

(d) User's Selection Item DB44

The user's selection item DB44 defines the contents of a combo item and a choice item. The DB exists only one within the portable remote terminal 11.

A key name 44-1 represents a key which identifies a record group. The key name is used in the reference key 42-7 of the item definition DB42. An item value 44-2 represents an item value within the group and corresponds to a record value in the choice item. An item contents 44-3 represents item contents which correspond to those in the combo item.

(e) Object Storage DB45

The DBs exist in the plural within the portable remote terminal 11. The DBs exist as many as the number of objects to be linked with the personal computer 10.

A serial ID45-1 represents a record ID in a data base on the side of the portable remote terminal 11 which is sequentially applied at the time of the synchronous processing. At the time of new addition, the ID is applied to the end as a serial number. At the time of deletion, the ID has a blank. A record ID45-2 represents a record ID on the side of the personal computer 10 which is not changed on the side of the portable remote terminal 11. A time stamp 45-3 represents a time stamp of a record on the side of the personal computer 10. The time stamp is not changed on the side of the portable remote terminal 11. At the time of new creation, the time stamp has a blank.

An updating flag 45-4 is a flag of a record to be updated which represents an object not to be synchronized as 0 and an object to be synchronized as 1. Items 45-5 to 45-*n* represent record item contents values (n exist as many as the number of items which a user will bring out).

Next, initialization processing, downloading of host DB data, data editing on a portable remote terminal, synchronous processing of data and editing of a data display item in thus structured data link system of the present invention will be outlined with reference to the drawings.

(1) Initialization Processing

Figure 9:
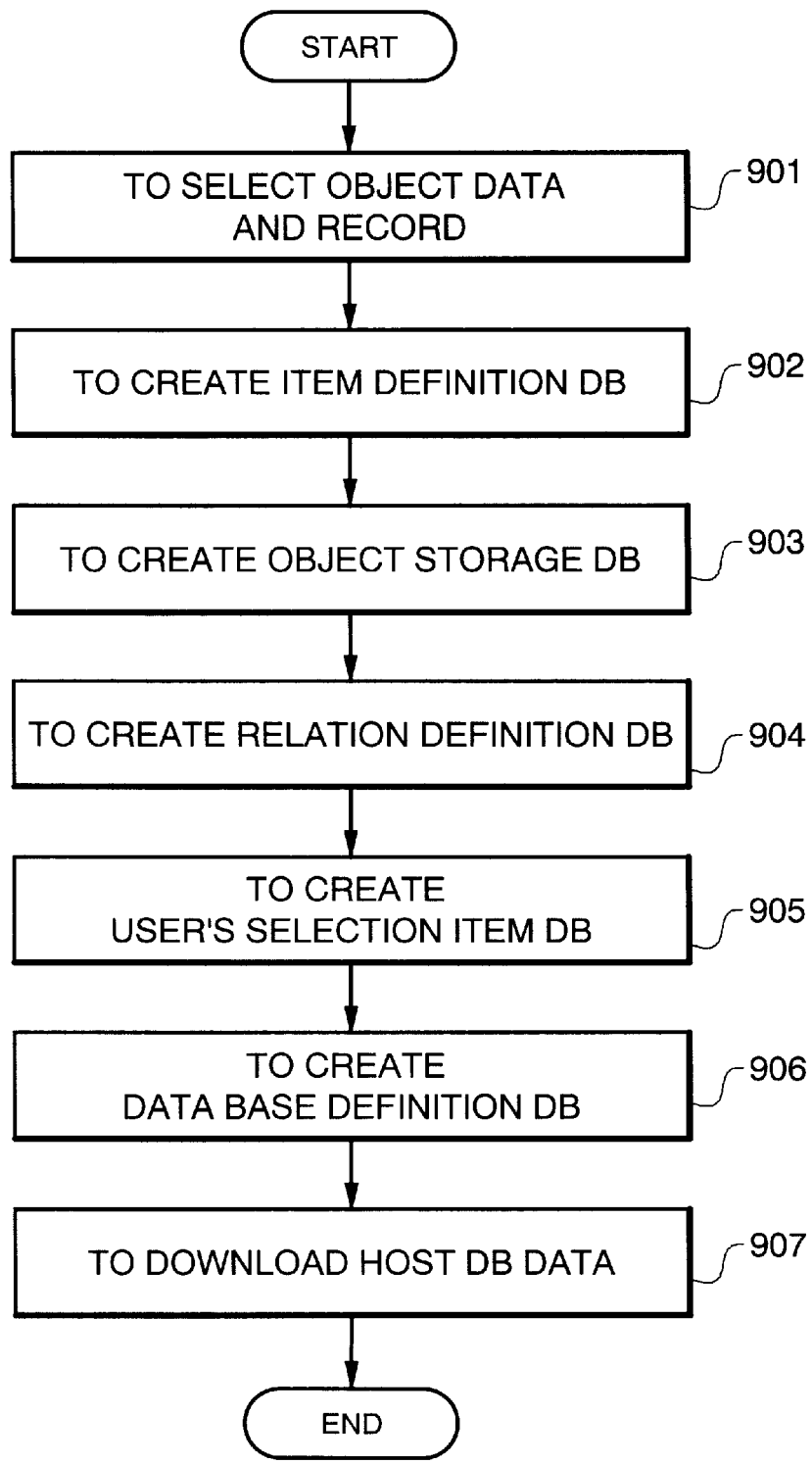
FIG. 9 is a flow chart for use in explaining the contents of initialization processing by an application program of the personal computer of the present invention.

As the initialization processing, the application program A21 of the personal computer 10 generates a DB set forth below as the setting of a DB link item. The following initialization processing is executed by user's instructions to the application program A21. FIG. 9 shows a flow chart of the initialization processing.

On the personal computer 10, prepare a table of data which might be taken out into the portable remote terminal 11 and a table of field information and select business object data which will be taken out by a user and its record item based on the information (Step 901). The selection of business object data to be taken out and its record item is conducted by the user's operation of the application program A21.

Then, based on the information, create the item definition DB42 which defines a record attribute (Step 902).

According to the contents of the created item definition DB42, create an individual object storage DB (45*a*, 45*b*, 45*c*, . . . , 45*n*) region (Step 903).

Next, create the relation definition DB43 which defines relations such as detailed/link destination corresponding to the created object storage DB (45*a*, 45*b*, 45*c*, . . . , 45*n*) from the item definition DB42 (Step 904).

Furthermore, when an alternative item data region exists within the object storage DB (45*a*, 45*b*, 45*c*, 45*n*), create a region of the user's selection item DB44 (Step 905). Each of the created DBs is managed by the data base definition DB41 which is created for defining a relation of a DB every time the DB is created (Step 906).

Next, download the data of the host DB22 into the portable remote terminal 11 (Step 907). Downloading of the data of the host DB22 is conducted by the application program A21. On the basis of a record taken out from the host DB22 and according to the contents of a record attribute of the item definition DB42, write data into the corresponding object storage DBs 45*a* to 45*n* (Step 907).

(2) Data Editing on the Portable Remote Terminal

Editing work of data taken in into the portable remote terminal 11 is conducted by the application program B31. FIGS. 12 and 13 each show a data editing screen on the portable remote terminal 11.

In FIG. 12, displayed in the list are a company name 501, a telephone number 502 and a facsimile (facsimile number) 503.

In FIG. 13, displayed in the card are information regarding one of the companies listed in FIG. 12 (company name 601, how to read 602, address (metropolis/prefecture, city/ward) 603, telephone number 604, facsimile 605, relation 606).

On the list display of FIG. 12, by pressing (double tap) down a line in which data of the company name 501, the telephone number 502 and the facsimile 503 is displayed with the pen 13 as an input means of the portable remote terminal 11, a selected record is displayed in the card to allow editing of each field.

(3) Synchronous Processing

The processing of synchronizing the host DB22 of the personal computer 10 and the DB40 of the portable remote terminal 11 is executed by the application program A21. Conducted here is reading the DB40 on the portable remote terminal 11 by the personal computer 10 to write the data into the host DB22 in the personal computer 10. In other words, write a record newly added/updated into the host DB22. In addition, set a link field between tables to a correct record ID to solve link information. This synchronous processing is automatically executed by the application program A21 upon connection of the portable remote terminal 11 to the personal computer 10. The processing is also executed by an instruction from the portable remote terminal 11.

Figure 10:
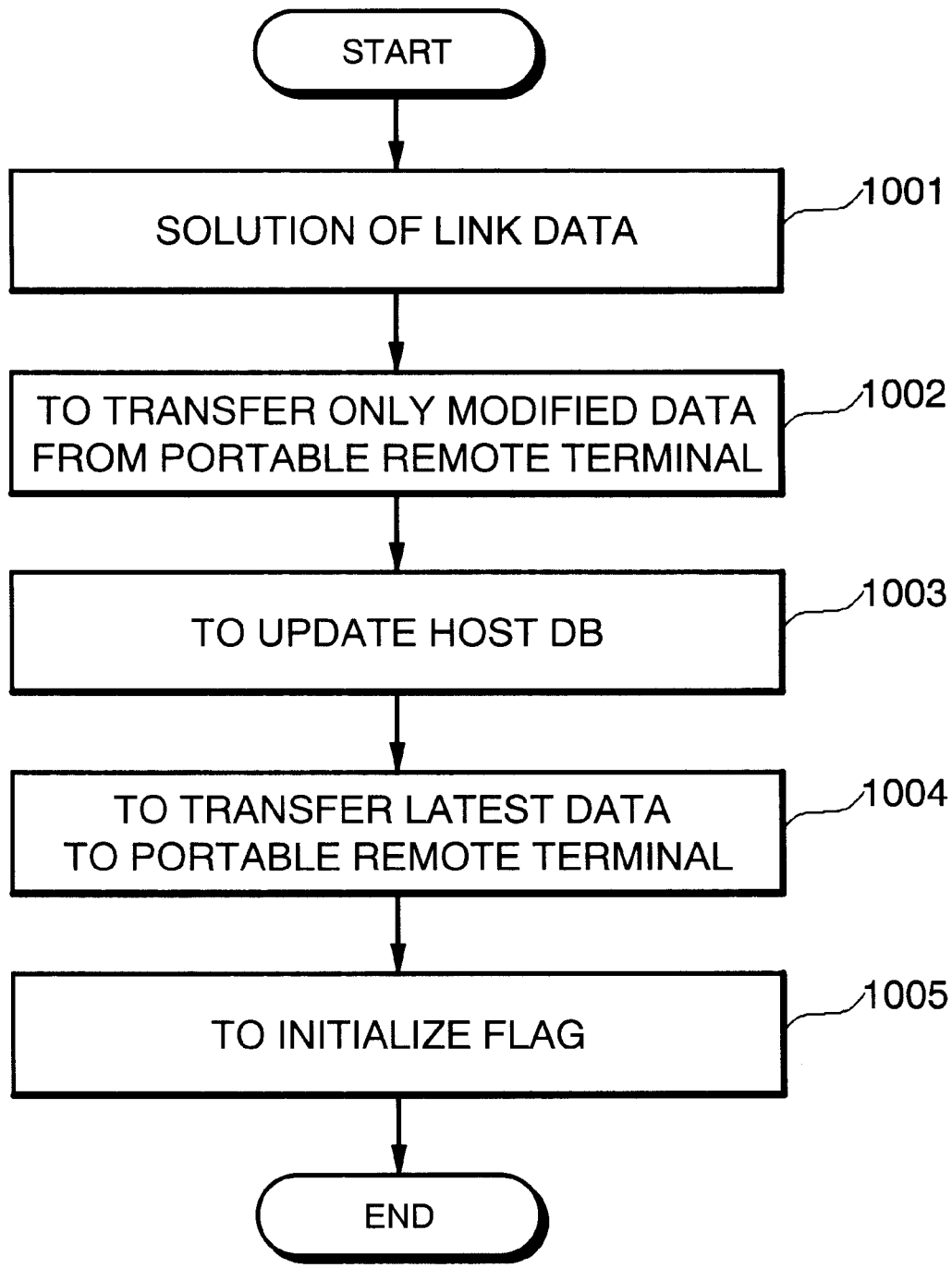
FIG. 10 is a flow chart for use in explaining the contents of the processing of synchronizing the personal computer and the portable remote terminal of the present invention.

In the following, the synchronous processing by the application program A21 will be described with reference to the flow chart of FIG. 10.

Solution of link data on the portable remote terminal 11 (Step 1001).

In the program of the application program B31 of the portable remote terminal 11, such link data solution processing as set forth below is conducted prior to the synchronous processing. This link data solution processing is automatically executed by the application program B31. The present processing is usually conducted also in the screen editing processing by the application program B31.

In the following, description will be made of solution of a link between records and reference to a record.

According to the data type 42-3 of the record 422 of the item definition DB42, an attribute of the item 5 (45-9) of the record 451 of the object storage DB45a (company) is a link field. In this case, since the reference DB name 42-6 indicates "product" to link with the object storage DB45b (product), according to the contents "1" of the item 5 (45-9) of the record 451 of the object storage DB45a (company), the record 452 of the object storage DB45b (product) whose serial ID is "1" is supposed to link with the record 452. Furthermore, since the reference key 42-7 indicates "product name", the contents of the item 1 (45-5) of the record 452 of the object storage DB45b (product) will be referred to by the record index 42-12.

As to an attribute of the item 6 (45-10) of the record 451 of the object storage DB45a (company), according to the link destination item name 42-8 and the reference item name 42-9 of the record 423 of the item definition DB42, the contents of the reference item name 42-9 of the reference DB indicated by the link destination item name 42-8 will be referred to. With the link destination item name 42-8 indicating "line of trade", a field of a link destination indicated by the reference DB name 42-6 (product) and the reference key 42-7 (product name) of the record 422 will be referred to. Also, since the item 5 (45-9) of the record 451 of the object storage DB45a (company) indicates "1", price of the record 452 of the object storage DB45b (product) whose serial ID is "1" will be referred to and in the item 6 (45-10) of the record 451 of the object storage DB45a (company), "10000" is stored as real data.

As the premise for conducting synchronous processing, updating flag setting processing is conducted in screen editing processing by the application program B31. Updating flags exist in the data base definition DB41 and the item definition DB42, and the object storage DB45. The DB updating flag 41-4 of the data base definition DB41 is set up when updating or addition is made of the managed data base. The updating flag 42-13 of the item definition DB42 is set up when the contents of the item width 42-5, the list display order 42-10 and the card display order 42-11 are modified. The updating flag 45-4 of the object storage DB is set up when a record is updated.

Transfer only the modified data from the portable remote terminal 11 to the personal computer 10 (Step 1002).

An object storage DB corresponding to a record whose DB updating flag 41-4 in the data base definition DB41 is changed to "1" is searched and only the searched object storage DB is regarded as a DB to be synchronized. In the case of the data base definition DB41 shown in FIG. 4, since the DB updating flags 41-4 of the records 412 and 415 have "1", they are regarded as DBs to be synchronized.

Of the DBs considered to be synchronized (item definition DB42, object storage DB45a (company)), only a record whose updating flag indicates "1" is transferred to the side of the personal computer 10.

Merge at the personal computer 10 (Step 1003). DB on the side of the personal computer 10 is updated by the updated data which is transferred from the portable remote terminal 11.

Transfer latest data to the portable remote terminal 11 (Step 1004). The personal computer 10 writes data updated later than the previous synchronization time over old data in the portable remote terminal 11.

After the completion of the above-described transfer of the latest data, initialize a flag (Step 1005). The synchronization time and date 41-3 of the data base definition DB41 is updated and the updating flags 41-4, 42-13 and 45-4 of the data base definition DB41, the item definition DB42 and the object storage DB45a (company) are initialized.

(4) Data Display Item Editing

A user selects and retains the order of data items to be displayed in data editing (display/input) on the portable remote terminal 11.

Shown in FIG. 11 is a display screen 210 for making a user select the order of data items to be displayed in data editing (display/input) on the portable remote terminal 11 conducted by the application program B31 illustrated in FIG. 3.

DB data being read into the portable remote terminal 11 is displayed as record items within a window 221 at the left part of the screen. When there is one to be displayed among the items, selecting the item using the pen 13 as indicated by a highlight display example 242 leads to addition and deletion of display by arrow buttons 231a and 231b. In the example of FIG. 11, pressing the arrow button 231a leads to addition of the item indicated by the highlighted display example 242 to a window 222 at the right part of the screen. A highlight display example (243) shows a state of an item being selected.

The order of displayed items can be changed by using arrow buttons 232a and 232b with respect to the highlight display example (243). Using the upward arrow 232a makes the highlight display example (243) have an immediately preceding displayed item and using the downward arrow 232b makes the highlight display example (243) have an immediately succeeding displayed item.

As described in the foregoing, the present embodiment enables the portable remote terminal 11 to arbitrarily take out a part of data items of the host DB22 of the personal computer 10 and conduct data editing (display/modification/input). When a user brings out and uses the portable remote terminal 11 at his or her destination, therefore, effective use of data is possible.

As described in the foregoing, the system for linking data between a personal computer and a portable remote terminal of the present invention and the data linking method therefor attain the following effects.

First, the processing of taking in data from the personal computer into the portable remote terminal and the processing of synchronizing the portable remote terminal with the personal computer can be executed in a short time period because only the data that needs to be brought out from a data base of the computer by the portable remote terminal is selectable.

Secondly, quick application of data is enabled by selectively taking in data that needs to be brought out from a data base of the computer by the portable remote terminal.

Thirdly, since the order of displayed items or display/non-display of data brought out into the portable remote terminal can be changed by a user as required, efficient use of data is possible.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A System for linking data between a computer and a portable remote terminal which extracts data of a host data base on said computer into said portable remote terminal, displays and edits the extracted data on said portable remote terminal and conducts synchronous processing of updated data in said portable remote terminal and a data base in said computer, wherein said computer comprissing:

means for selecting object data to be brought out from said host data base into said portable remote terminal and a record item of the object data;

means for creating on said portable remote terminal, with respect to selected object data, an item definition data base which defines a record attribute, an object storage data base which stores object data on a record basis correspondingly to said item definition data base, a relation definition data base which defines relations among object data stored in said object storage data base and a definition data base which defines relations among the respective data bases created;

means for writing, on the basis of a record taken out from said host data base, data into the corresponding one of said object storage data bases according to said item definition data base; and synchronization means for conducting synchronous processing of reading updated data from said object storage data base of said portable remote terminal and writing the data into said host data base of said computer; and said portable remote terminal comprising:

means for conducting, when a record item of said object storage data base refers to other said object storage data base, link data solution processing based on a record attribute of said item definition data base; and means for changing, when the display order of object data of said object storage data base is changed or when existence/non-existence of display is selected, the display order of object data of said item definition data base or an attribute indicative of existence/non-existence of display according to the contents of the change or the selection; and wherein said synchronization means of said computer reads an updated record from said object storage data base of said portable remote terminal to update said host data base of said computer.

2. The system for linking data between a computer and a portable remote terminal as set forth in claim 1, wherein said portable remote terminal further comprises updating flag setting means for setting, when updating or addition of a record is made of said object storage data base, an updating flag at the corresponding record of the object storage data base.

3. The system for linking data between a computer and a portable remote terminal as set forth in claim 1, wherein said portable remote terminal further comprises editing means for editing object data stored in said object storage data base and conducting change of the display order of data items or selection of existence/non-existence of display.

4. The system for linking data between a computer and a portable remote terminal as set forth in claim 1, wherein said portable remote terminal further comprises updating flag setting means for setting, when updating or addition of a record is made of said object storage data base, an updating flag at the corresponding record of the object storage data base, and wherein, said updating flag setting means, when updating or addition of a record is made of said object storage data base, sets a flag indicating that the object storage data base in question is updated at said definition data base, and said synchronization means searches said object storage data base updated by a flag of said definition data base and reads a record at which said object storage data base updating flag searched is set to update said host data base of said computer.

5. The system for linking data between a computer and a portable remote terminal as set forth in claim 1, wherein for each record item, said item definition data base has, as attributes, other object storage data base to be referred to by the record item in question and a record item, a record item with which the record item in question links, and a record item of an object storage data base to be referred to by the linked record item.

6. A method of linking data between a computer and a portable remote terminal which extracts data of a host data base on said computer into said portable remote terminal, displays and edits the extracted data on said portable remote terminal and conducts synchronous processing of updated data in said portable remote terminal and a data base in said computer, comprising the steps of said computer of:

with respect to object data to be brought out into said portable remote terminal which is selected from said host data base and a record item of the object data, creating, on said portable remote terminal, an item definition data base which defines a record attribute, an object storage data base which stores object data on a record basis correspondingly to said item definition data base, a relation definition data base which defines relations among object data stored in said object storage data base and a definition data base which defines relations among the respective data bases created, on the basis of a record taken out from said host data base, writing data into the corresponding one of said object storage data bases according to said item definition data base, and conducting synchronous processing of reading updated data from said object storage data base of said portable remote terminal and writing the data into said host data base of said computer, the steps of said portable remote terminal of:

when a record item of said object storage data base refers to other said object storage data base, conducting link data solution processing based on a record attribute of said item definition data base, and when the display order of object data of said object storage data base is changed or when existence/non-existence of display is selected, changing the display order of object data of said item definition data base or an attribute indicative of existence/non-existence of display according to the contents of the change or the selection, and the step of said computer of reading an updated record from said object storage data base of said portable remote terminal to update said host data base of said computer.

7. The method of linking data between a computer and a portable remote terminal as set forth in claim 6, further comprising the step of said portable remote terminal of, when updating or addition of a record is made of said object storage data base, setting an updating flag at the corresponding record of the object storage data base.

8. The method of linking data between a computer and a portable remote terminal as set forth in claim 6, further comprising the steps of said portable remote terminal of:

when updating or addition of a record is made of said object storage data base, setting an updating flag at the corresponding record of the object storage data base and further setting a flag indicating that the object storage data base in question is updated at said definition data base, wherein in synchronous processing of said computer, said object storage data base updated by a flag of said definition data base is searched and a record at which said object storage data base updating flag searched is set is read to update said host data base of said computer.

9. A computer readable memory which stores a program for linking data between a computer and a portable remote terminal which extracts data of a host data base on said computer into said portable remote terminal, displays and edits the extracted data on said portable remote terminal and conducts synchronous processing of updated data in said portable remote terminal and a data base in said computer, wherein said data link program comprises the steps of:

on the side of said computer with respect to object data to be brought out into said portable remote terminal which is selected from said host data base and a record item of the object data, creating, on said portable remote terminal, an item definition data base which defines a record attribute, an object storage data base which stores object data on a record basis correspondingly to said item definition data base, a relation definition data base which defines relations among object data stored in said object storage data base and a definition data base which defines relations among the respective data bases created, on the basis of a record taken out from said host data base, writing data into the corresponding one of said object storage data bases according to said item definition data base, and conducting synchronous processing of reading updated data from said object storage data base of said portable remote terminal and writing the data into said host data base of said computer, on the side of said portable remote terminal when a record item of said object storage data base refers to other said object storage data base, conducting link data solution processing based on a record attribute of said item definition data base, and when the display order of object data of said object storage data base is changed or when existence/non-existence of display is selected, changing the display order of object data of said item definition data base or an attribute indicative of existence/non-existence of display according to the contents of the change or the selection, and on said computer, reading an updated record from said object storage data base of said portable remote terminal to update said host data base of said computer.

10. The computer readable memory as set forth in claim 9, wherein said data link program on the side of said portable remote terminal further comprises the step of, when updating or addition of a record is made of said object storage data base, setting an updating flag at the corresponding record of the object storage data base.

11. The computer readable memory as set forth in claim 9, wherein said data link program on the side of said portable remote terminal further comprises the step of, when updating or addition of a record is made of said object storage data base, setting an updating flag at the corresponding record of the object storage data base and further setting a flag indicating that the object storage data base in question is updated at said definition data base, and wherein in synchronous processing of the data link program on the side of said computer, said object storage data base updated by a flag of said definition data base is searched and a record at which said object storage data base updating flag searched is set is read to update said host data base of said computer.

\* \* \* \* \*